United States Patent [19]

Belt et al.

[11] 4,022,443

[45] May 10, 1977

[54] APPARATUS FOR THE CONCENTRATION AND RECOVERY OF PLATINUM FAMILY METALS FROM CERAMIC MATERIALS

[75] Inventors: Roger Francis Belt, Morristown, N.J.; Richard Charles Puttbach, Santa Rosa, Calif.; Christopher Thomas Schreiber, Parsippany, N.J.

[73] Assignee: Litton Systems, Inc., Beverly Hills, Calif.

[22] Filed: Dec. 24, 1975

[21] Appl. No.: 644,028

[52] U.S. Cl. .............................................. 266/148
[51] Int. Cl.² ........................................ C22B 61/00
[58] Field of Search .......... 75/83; 423/22; 266/144, 266/148, 149, 153, 154

[56] References Cited

UNITED STATES PATENTS

| | | | |
|---|---|---|---|
| 478,907 | 7/1892 | Blackmore | 266/153 |
| 3,348,942 | 10/1967 | Davenport | 75/63 |
| 3,867,137 | 2/1975 | Inouye | 75/83 |

*Primary Examiner* — Gerald A. Dost
*Attorney, Agent, or Firm* — M. Michael Carpenter

[57] ABSTRACT

A method and apparatus for the concentration and recovery of platinum family metals from ceramic materials is disclosed, wherein the metal desired is first transported from the ceramic material through the utilization of a temperature gradient in a specially adapted furnace utilizing the volatile characteristics of the oxide of the metal desired. The volatile oxide is deposited upon a nucleation surface where it is reduced by means of hydrogen as the furnace cools to recover the metal.

13 Claims, 3 Drawing Figures

APPARATUS FOR THE CONCENTRATION AND RECOVERY OF PLATINUM FAMILY METALS FROM CERAMIC MATERIALS

BACKGROUND OF THE INVENTION

The present invention relates to a method and apparatus for concentrating and recovering platinum family metals from ceramic materials and, more particularly, to a pyrometallurgy process which may be used to remove volatile oxides of the platinum group of metals from a mixture of ceramic substrates.

Metals from the platinum family are normally refined from ore found most abundantly in Canada, South Africa, and Russia. Such ore usually comprises a mixture of the platinum family metals, along with nickel and traces of gold and silver. The ore is crushed, ground and treated by a flotation process which removes the sulfides along with the platinum group of metals. The sulfides and platinum group of metals are then roasted and blown against a matt. The material against the matt consists mostly of oxides of the platinum group. The platinum group metals are then separated by an electrolytic process and are further separated by continuing chemical processes. The processes outlined above are described in several references (see Treatise on Analytical Chemistry, edited by I. M. Kolthoff, Part II, Vol. 8, "Analytical Chemistry of Platinum Metals," published by Interscience, Division of John Wiley, 1963) and will not be described further here.

Another method for purification of iridium which is already 90 percent pure is disclosed in U.S. Pat. No. 3,867,137 by H. Inouye. This method does not disclose a means of recovering iridium from ceramic material since the fused silica tube used therein will react with many ceramic materials from which it is desirable to remove iridium or other platinum group metals.

In the history of precious metals, the current price of gold is of major concern. While gold has recently sold as high as $200 per troy ounce, iridium sold at $400 per troy ounce. Iridium and some of the other precious metals are not acclaimed commercially as are gold and platinum. However, these metals are valued for their special scientific capabilites and properties. For example, iridium is used to manufacture crucibles for high temperature crystal growth and as a catalyst in the chemical industries for refining various products. As these products are manufactured or refined, the iridium is often dissipated. It is the need to efficiently recover the dissipated iridium from ceramic material that has brought about the present invention.

SUMMARY OF THE INVENTION

Pure iridium metal, iridium oxide and/or other platinum group metals can be removed and concentrated from ceramic materials in powder form such as aluminum oxide and zirconium oxide by the oxidation and subsequent physical transportation of the iridium oxide in a thermal gradient created in a specially adapted furnace. The oxides which are thus removed and concentrated are of sufficient purity to allow direct reduction by hydrogen to a pure iridium metal powder as the furnace cools. This pure iridium metal may be then recycled through customary procedures. The process described by the present invention not only works well with iridium but also works with other platinum group metals whose oxides are volatile.

It has been found that the invention doubles the yield of iridium from ceramic powders, which, prior to the present invention, would yield less than fifty percent of the iridium content if conventional wet chemical separations were used. Further, the present invention provides a method that increases the yield while substantially reducing the separation and recovery costs.

Accordingly, it is an object of the invention to provide a method of recovering platinum group metals from ceramic material which is efficient and economical.

It is a further object of the present invention to provide apparatus capable of recovering platinum family metals and oxides of platinum family metals from ceramic material.

A still further object of the present invention is to provide apparatus for recovering iridium and iridium oxide from aluminum oxide and zirconium oxide ceramic powders.

Other objects and further advantages of the present invention will become apparent to those skilled in the art after careful consideration of the specification and drawings, wherein:

BRIEF DESCRIPTION OF THE PREFERRED EMBODIMENT

Figure 1:
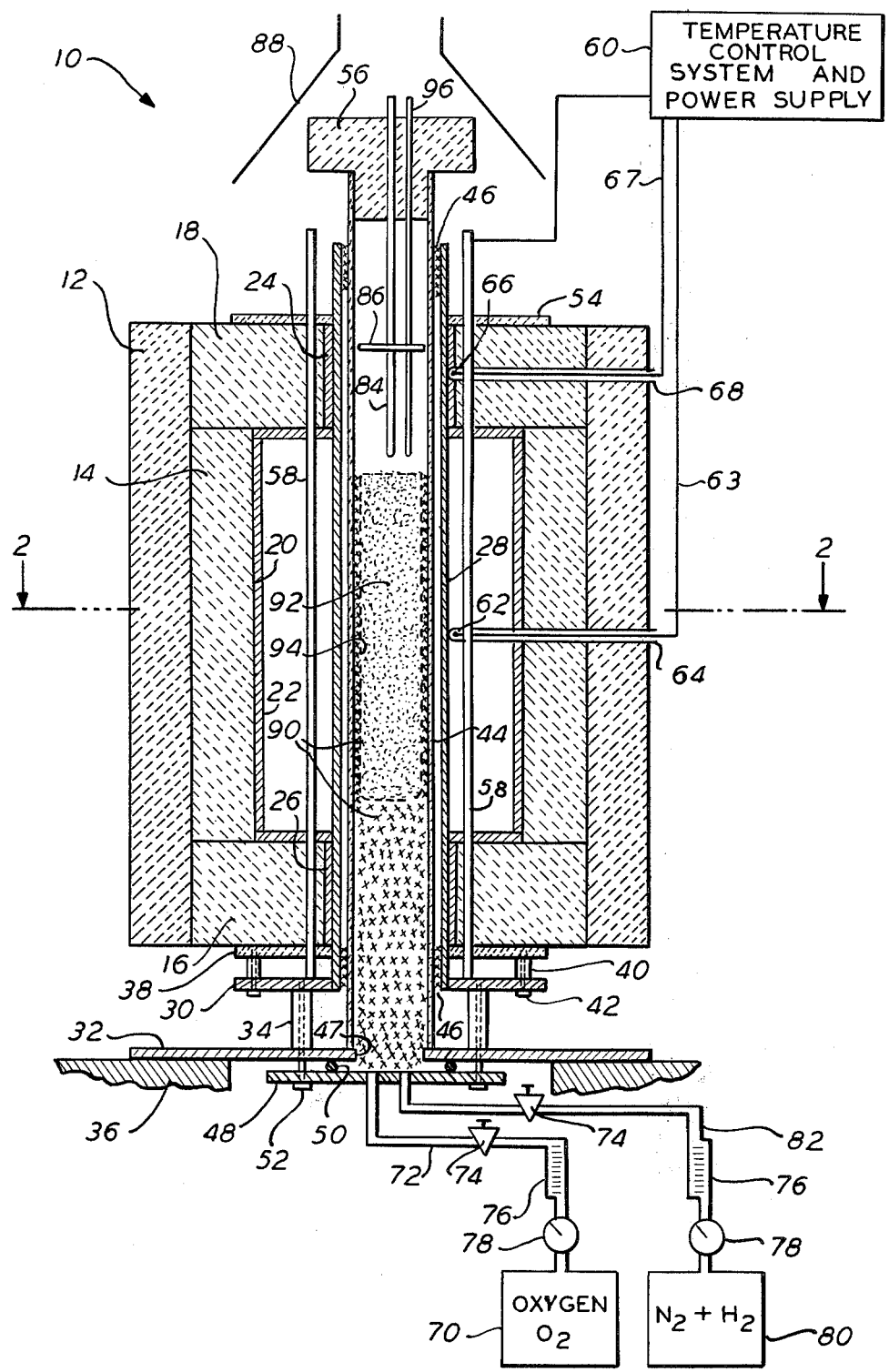
FIG. 1 is a cross-sectional view taken along line 1—1 of FIG. 2 showing a furnace which is capable of concentrating and recovering platinum group metals from ceramic materials.

Referring now to the drawings, a furnace for the concentration and recovery of platinum family metals, including pure iridium metal (Ir) and/or iridium oxide ($IrO_2$) is shown generally at 10 in FIG. 1 having an outer insulating cover 12 constructed from ceramic fiber. The outer cover 12 is typically 30 inches in diameter and 40 inches long, constructed tubularly to surround an inner insulating cover 14 of firebrick that is provided with a bottom flange 16 and a separate top flange 18 which forms an inner chamber 20. Inner chamber 20 receives a cylindrically shaped alumina casting 22 which is closed at each end to line the chamber 20 and provide the inner support structure for the furnace 10. Aligned with the longitudinal axis of the inner support structure 22 are upper and lower tubular extensions 24 and 26, respectively, which are aligned to receive a tubular core member 28 that passes through the full vertical height of the furnace outer and inner insulating covers 12 and 14 to close the inner chamber 20. The upper and lower extensions 24 and 26 and the core 28 are all formed from alumina.

The alumina core 28 is attached to the inner opening of a washer shaped steel support plate 30 which, in turn, is supported on a steel base plate 32 by standoffs 34. The base plate 32 rests upon a suitable frame 36. A second washer shaped support plate 38, constructed from a refractory material known as maronite, is separated from the base plate 32 by standoffs 40 also constructed from maronite. The standoffs 40 are held in place by a ring of steel bolts 42 which pass from the lower surface of the plate 30, through the standoffs 40 and into plate 38. The inner insulating cover 14 and inner support structure 22 rest upon the support plate 38.

Passing through the center of the core 28 and extending beyond each end thereof is a tube 44 typically constructed from a refractory material, such as mullite, with a length of 60 inches and an inside diameter which may vary from 2.75 to 6.25 inches. The mullite tube 44 is separated from the core 28 by ceramic fiber 46 inserted at the ends of the core 28 between the inner surface of the core and the outer surface of the tube 44. The refractory tube 44 is attached to the base plate 32 and aligned with a centrally located opening 47 within the plate 32 which is closed by a sealing plate 48. The sealing plate 48 seals the base plate opening 47 by compressing a rubber O-ring 50 as a ring of bolts 52 is tightened into the base plate 32.

A top washer shaped sealing plate 54, constructed from maronite, rests tightly against the core member 28 on the top flange 18 of the inner insulating cover 14. The mullite tube 44 is closed at its upper end by a cap 56 constructed from firebrick to complete the structure of the furnace 10.

Figure 2:
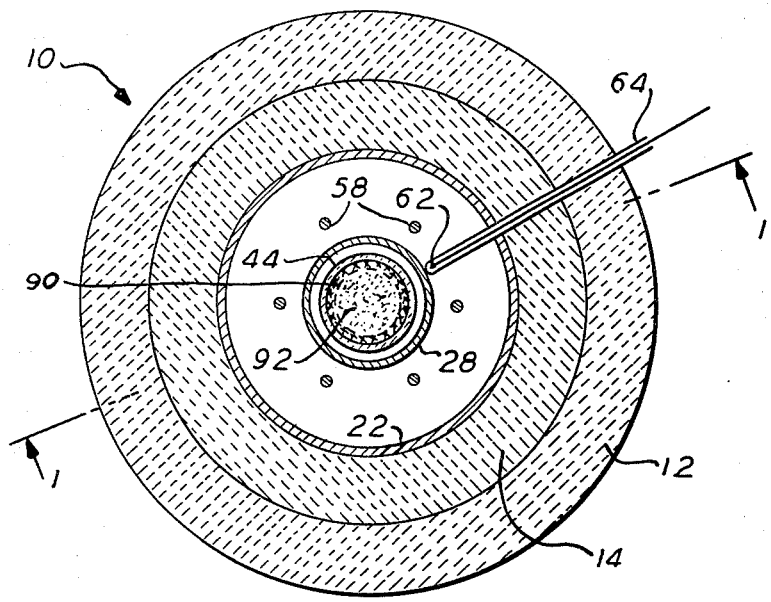
FIG. 2 is a sectional view of the furnace taken along line 2—2 of FIG. 1.

Supported upon support plate 30 and passing through support plate 38, lower flange 16, inner support structure 22, top flange 18 and top sealing plate 54, are six heating elements 58, best seen in FIG. 2, constructed from silicon carbide. These elements parallel the core 28 and refractory tube 44 and pass through the inner chamber 20 formed by the inner support structure 22. The heaters are energized from a power supply 60 which provides power thereto under the control of a control thermocouple 62. The control thermocouple 62 mounts in a thermocouple tube 64 that passes through the outer insulating cover 12, inner insulating cover 14 and inner support structure 22 to rest against the furnace core tube 28. Wires 63 connect the thermocouple 62 to the power supply 60.

A second control thermocouple 66 may be mounted within a second thermocouple tube 68 which passes through the outer insulating cover 12 and the top flange 18 of inner cover 14 in the upper areas of the furnace. The second control thermocouple 66 connects to the power supply 60 via wires 67 and is used to monitor the temperature gradient between the hot zone and the cold zone.

Figure 3:
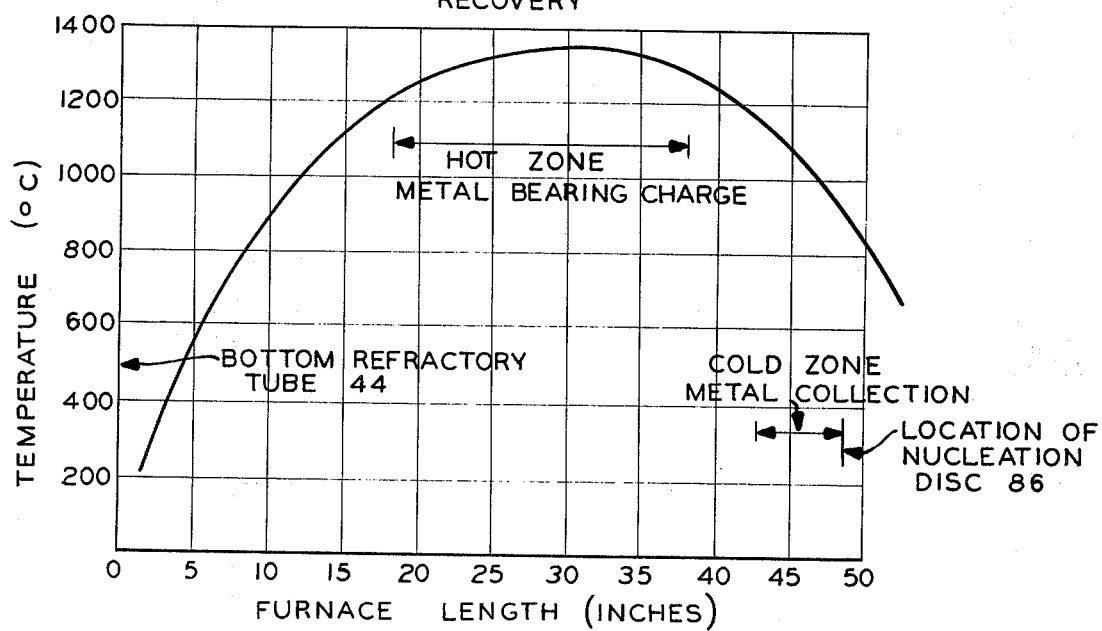
FIG. 3 is a plot showing the temperature gradient of a typical furnace embodying the present invention.

The so-called hot zone is found within the inner support structure 22 generally in the area of the thermocouple 62, while the cold zone is found in the general area of the refractory tube 44 which passes through the top flange 18. The temperature gradient is used to encourage the transportation of the iridium oxide or other oxides of platinum group metals which are volatile, as will be explained hereinbelow. A typical temperature gradient of the furnace 10 along the refractory tube 44 is shown in FIG. 3, wherein the hot zone is labeled "Metal Bearing Charge" and the cold zone is labeled "Metal Collection."

Another method of testing the temperature gradient during the heating of the furnace is to simply remove the firebrick cap 56 and slowly insert a ceramic protected thermocouple along the longitudinal axis of the refractory tube 44.

A pressure tank 70 supplies oxygen to the chamber formed by the refractory tube 44, sealing plate 48 and cap 56 through a suitable connecting tube 72 which includes a control valve 74, flow meter 76 and pressure gauge 78. A second pressure tank 80 supplies a mixture of nitrogen and hydrogen through the sealing plate 48 via a tube 82 which also incorporates a control valve 74, flow meter 76 and pressure gauge 78. The mixture of nitrogen and hydrogen may vary; but in the preferred embodiment, a mixture of 85 percent nitrogen to 15 percent hydrogen by a volume has been satisfactorily used.

The flow rate of the oxygen or the mixture of nitrogen and hydrogen is adjusted by valves 74 and monitored by flow meters 76. As each gas passes up the refractory tube 44, it passes around a nucleation tube 84 which is mounted along the longitudinal axis of the refractory tube 44 within the firebrick cap 56. The nucleation tube 84 mounts a nucleation disc 86 which substantially closes the cylindrical cross section of the tube 44. After the gas flows around the nucleation disc 86, it passes around and through the firebrick cap 56 to be exhausted through an exhaust hood 88.

The refractory tube 44 is loaded with clear zirconium oxide ($ZrO_2$) to a depth of approximately two inches inside the chamber formed by the inner support structure 22, as shown at 90 in FIG. 1. The ceramic material 92 which bears metals from the platinum family is then placed within a paper tube 94, shown by dashed lines in FIG. 1, and inserted along the longitudinal axis of refractory tube 44. Clear zirconium oxide 90 is then placed between the outer surface of the paper tube 94 and the inner surface of the refractory tube 44 to complete the charging of the furnace 10. The furnace is then closed by placing the nucleation tube 84 and disc 86 in the position shown as the cap 56 is placed in the top of tube 44. The nucleation tube 84 and disc 86 are constructed from mullite. An alumina rod 96 may be inserted through the firebrick cap 56 and the nucleation disc 86 to monitor the transportation of the platinum family metal from within the ceramic bearing material 92 in the hot zone of the furnace toward the cold zone.

The ceramic material 92 may be in a powder or grog form and may be aluminum oxide, zirconium oxide, a combination of both or any other ceramic material which contains platinum family metals whose oxides are volatile. The latter include: iridium (Ir), ruthenium (Ru), rhodium (Rh), and osmium (Os).

These platinum family metals share one common feature in that their oxides are volatile below 1200° C. The grog or powder 92 bearing the platinum family metal is located within the high temperature zone created by the resistance heating elements 58. In this zone the temperature is increased until it reaches 1200° to 1475° C, at which point the platinum family metal within the ceramic powder, for example, iridium metal within aluminum oxide, is oxidized to form an oxide which is vaporized and carried by the flowing oxygen from the bottom to the top of the refractory tube 44. As the flowing iridium oxide, for example, passes into the area of the nucleation tube 84 and disc 86, the reduced temperatures within this relative cold zone, which is beyond the heating elements 58, causes the iridium oxide to collect upon the nucleation tube and disc. The disc 86 may be moved up or down within the cold zone to additionally decrease or increase the cold zone temperature. It should be apparent from a review of FIG. 3 that the hot zone configuration cannot be easily adjusted once its maximum temperature is established. However, hot zone configuration can be affected to some degree by the tube size, loading of the charge or the shape of the charge.

In operation, the furnace 10 is charged as described above. Once the nucleation tube 84, disc 86 and cap 56 are replaced, the furnace is turned on and heated at a rate of 30° to 40° C per hour to a temperature of about 1350° C. It will be understood that the paper tube 94 will burn off at a temperature well below the temperature required to combine the flowing oxygen with the platinum family metals. The temperature build-up within the furnace 10 is monitored through the utilization of the thermocouples 62 and 66. As the temperature within the hot zone reaches approximately 800° C, the flow of oxygen is initiated by opening the control valve 74 to allow the oxygen to flow at a rate which may vary from two to twenty cubic feet per hour. At this time the temperature gradient within the furnace is also checked to make certain that it follows the curve shown in FIG. 3. After the temperature of 1200° to 1475° is reached in the hot zone, the furnace temperature is monitored on a daily basis during operation. The alumina rod 96 and/or the nucleation tube 84 and disc 86 are removed daily to monitor the transportation progress of the volatile oxides. As the rods and disc are removed, any excess iridium or iridium oxide, for example, which has been transported onto the surfaces in the cold zone may be recovered by scraping the iridium into a container.

When the transport of the iridium, in the form of iridium oxide, from the grog 92 has been completed, the flow of oxygen is terminated; and the forming gas comprising nitrogen and hydrogen is turned on through the manipulation of the second control valve 74. The forming gas may flow at a rate which varies between one to four cubic feet per hour. The furnace is then allowed to cool at a rate of about 30° to 40° C per hour. Once the furnace has cooled, the nucleation tube 84 and disc 86 are removed; and the iridium deposited thereon recovered. The iridium is now in the form of a pure iridium as the oxygen associated therewith has been carried off in the form of water vapor.

The bottom seal plate 48 is then removed by removing bolts 52 which allows the charge to drop from the furnace. A flat metal plate (not shown) replaces the sealing plate 48 at the bottom of the mullite tube 44. Using an alumina rod (also not shown), the iridium is then scraped off the walls of the mullite tube 44 and collected on the plate just placed in the position of the sealing plate 48. After scraping, the plate is removed and the iridium recovered.

The concentration of platinum family metals, including iridium oxide, upon the nucleation tube 84, disc 86 and tube 44, has been carried out in the laboratory, wherein the following examples are given to illustrate quantities and parameters which may be utilized:

EXAMPLE I

A small furnace similar to FIG. 1 was used. The heating elements 58 which were used were an alloy known as Kanthal A-1 in place of the silicon carbide elements. A charge of 470 grams of material consisting of a mixture of iridium (Ir) and iridium oxide ($IrO_2$) dispersed on a powdered zirconium oxide ($ZrO_2$) substrate was loaded into the furnace. The hot zone temperature (FIG. 3) was maintained at 1275°–1300° C, while the nucleation or cold zone temperature was 1114° C. The oxygen flow rate was adjusted at 1 liter/min (2.118 ft$^3$/hr). The total run length was 17 hours. A quantity of 2.5 grams of $IrO_2$ was collected at the cold zone. The nominal initial $IrO_2$ content of the charge was 1.0–1.5% by weight. The calculated yield of $IrO_2$ was 2.5/470 or 0.53%. The efficiency of removal ($IrO_2$ recovered/$IrO_2$ in charge) was about 30–50%. In the small furnace, the reducing gases, nitrogen and hydrogen, were not used. The furnace was allowed to cool and yield its iridium oxide ($IrO_2$) which was later reduced to pure iridium (Ir).

EXAMPLE II

The procedure of Example I was repeated, with the exception that a longer run time of 48 hours and a lower nucleation temperature of 1033° C was used, giving a calculated efficiency of 80–95% recovery of iridium oxide ($IrO_2$).

EXAMPLE III

A furnace identical to FIG. 1 was employed. A 6.25 inch I.D. mullite tube 44 was used as the central core container for the iridium-bearing charge. The charge consisted of 19,162 grams of iridium (Ir) and iridium oxide ($IrO_2$) on an alumina substrate. As the charge was of very fine particles (1-25$\mu$m), some clean granular zirconium oxide ($ZrO_2$) was placed between the charge and the walls of the mullite tube. The hot zone temperature (FIG. 3) was maintained at 1464° C. The nucleation or cold zone was kept at 800° C. The oxygen flow rate was fixed in the range of 11–18 ft$^3$/hr. The length of the run was 120 hours. After the transportation of volatile oxides ceased at the end of the run, the flow of oxygen was terminated and replaced with the flow of a reducing gas of 85% nitrogen ($N_2$) and 15% hydrogen ($H_2$). The reducing gas flow rate was 2 ft$^3$/hr, while the furnace cooled to room temperature at 30°–40° C/hr.

Upon termination of the run, 82.8 grams of materials were collected at the cold zone. These materials consisted of about 75% Ir and 25% other metals and metal oxides. The initial Ir content of the charge was assayed at 0.34% by weight. The calculated yield of Ir was 75% ×82.8/19162 or 0.32%. The efficiency of removal was 95%. Due to the presence of other metals, the Ir was finally separated in a last wet chemical process step

EXAMPLE IV

A furnace identical to FIG. 1 was again employed. A 2.75 inch I.D. mullite tube 44 formed the central container for the charge. The charge consisted of 823 grams of a spent platinum and iridium (Pt-Ir) catalyst formed on an alumina substrate. The estimated particle size was 500–1500 A. The hot zone temperature (FIG. 3) was maintained at 1200°–1400° C. The nucleation disc was kept at 800° C. The oxygen flow rate was 8.6–9.4 ft$^3$/hr. The length of the run was 169 hours. The charge was reduced while the furnace was cooled, as in Example III. Upon termination of the run 0.42 grams of Ir and other inorganics whose oxides were volatile were collected at the cold zone. About 10% was pure Ir. The initial precious metal content of the charge as assayed at 0.272% Pt and 0.008% Ir by weight. The calculated yield of Ir was approximately 10% ×42/823 or 0.005%. The efficiency of removal of Ir was about 65%. The Pt component of the catalyst remained on the alumina substrate of the original charge and did not transfer, as platinum oxide is not a volatile oxide.

While iridium oxide was the platinum family metal recovered in the examples described, the process described above is equally applicable to recover other platinum family metals whose oxides are volatile below 1200° C. Other modifications and variations of the preferred embodiment will become apparent to those skilled in the art, and the present invention should be limited only by the following claims.

The embodiments of the invention in which an exclusive property or privilege is claimed are defined as follows:

1. Apparatus for concentrating and recovering platinum family metals from ceramic material, comprising:
    a furnace having a central tube inert under conditions of heat to ceramic material for receiving said ceramic material bearing said platinum family metals;
    means for heating said tube and said ceramic material contained therein in a hot zone;
    means for partially closing said tube located in a zone removed from said means for heating to establish a cold zone;
    means connected to said tube for flowing an oxidizing gas through said tube and through said hot zone to generate volatile oxides of said platinum family metals which are carried to said means for partially closing said tube in said cold zone and deposited there by said flowing gas; and
    means connected to said tube for flowing a reducing gas through said tube and said hot and cold zones, respectively, after said volatile oxides are deposited on said means for partially closing said tube and while said furnace is cooled for reducing said oxides to said platinum family metals.

2. Apparatus for concentrating and recovering platinum family metals from ceramic material as claimed in claim 1 additionally comprising:
    means for adjustably controlling said means for heating said tube to heat said tube and said platinum family metals contained in said ceramic material to temperatures between 1300° C and 1475° C to oxidize said metals in the presence of said flowing oxidizing gas.

3. Apparatus for concentrating and recovering platinum family metals from ceramic material as claimed in claim 1, wherein:
    said means for partially closing said central tube includes an adjustably positioned disc for presenting a nucleationsurface to said flowing oxidizing gas whose position may be adjusted to adjust the temperature in the cold zone established thereby.

4. Apparatus for concentrating and recovering platinum family metals from ceramic material as claimed in claim 1, wherein at least one metal is selected from the platinum family metals consisting of iridium, ruthenium, rhodium and osmium.

5. Apparatus for concentrating and recovering platinum family metals from ceramic material as claimed in claim 1, wherein said metal is iridium.

6. A furnace for concentrating and recovering platinum family metals from ceramic material, comprising:
    a central tube of mullite filled with said ceramic material, said tube inert to said ceramic material at high temperatures;
    heating elements juxtaposed to said tube to establish a hot zone for heating said ceramic material;
    control means connected to said heating elements to control said heat in said hot zone between 1300° C and 1475° C;
    a nucleation disc for partially closing said center tube adjustably located within said tube to establish a cold zone and to adjust the temperature of said cold zone;
    means connected to said tube for flowing an oxidizing gas through said tube and said hot and cold zones to oxidize said platinum family metals in said hot zone into volatile oxides which are transported to said cold zone and concentrated on said nucleation disc; and
    means connected to said tube for flowing a reducing gas through said tube and said hot and cold zone to reduce said platinum family metals recovered on said nucleation disc as said furnace is allowed to cool for recovering a pure platinum family metal on said disc.

7. A furnace for concentrating and recovering platinum family metals as claimed in claim 6, wherein said metal is iridium.

8. A furnace for concentrating and recovering platinum family metals from ceramic material as claimed in claim 6, wherein said ceramic material is alumina.

9. A furnace for concentrating and recovering platinum family metals from ceramic material as claimed in claim 6, wherein said ceramic material is zirconium oxide.

10. A furnace for concentrating and recovering platinum family metals from ceramic material as claimed in claim 6, wherein at least one metal is selected from the platinum family metals, consisting of iridium, ruthenium, rhodium and osmium.

11. Apparatus for concentrating and recovering platinum family metals from ceramic materials, comprising:
    a furnace having a central tube inert under conditions of heat to ceramic materials for receiving said ceramic material bearing said platinum family metals;
    means for heating said tube and ceramic material contained therein in a hot zone;
    cap means for partially closing said tube located in a zone removed from said means for heating to establish a cold zone;
    nucleation surface means mounted on said cap means for presenting an adjustable nucleation surface which further closes said tube at said cold zone and which may be adjusted to vary the temperature in said cold zone;
    means connected to said tube for flowing an oxidizing gas through said tube and through said hot zone to generate volatile oxides of said platinum family metals, whereby said nucleation surface means which further closes said tube at said cold zone recovers said volatile ozides of said metals which are transported to said cold zone from said hot zone by said flowing gas.

12. Apparatus for concentrating and recovering platinum family metals from ceramic materials as claimed in claim 11, additionally comprising:
    means connected to said tube for flowing a reducing gas through said tube and said hot and cold zones, respectively, after said volatile oxides are recovered on said nucleation surface means and while said furnace is cooled, for reducing said oxides to said platinum family metals.

13. Apparatus for concentrating and recovering platinum family metals from ceramic materials as claimed in claim 11, wherein:
    said nucleation surface means includes a nucleation tube extending through said cap means and a nucleation disc mounted on said tube which presents a nucleation surface to said flowing oxidizing gas.

* * * * *